United States Patent
Cheng et al.

(10) Patent No.: US 7,677,758 B2
(45) Date of Patent: Mar. 16, 2010

(54) DISPLAY METHOD AND ILLUMINATION SYSTEM THEREOF

(75) Inventors: Chu-Ming Cheng, Hsinchu (TW); Shang-Yi Wu, Hsinchu (TW); Tien-Pao Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 214 days.

(21) Appl. No.: 12/101,330

(22) Filed: Apr. 11, 2008

(65) Prior Publication Data

US 2009/0147514 A1 Jun. 11, 2009

(30) Foreign Application Priority Data

Dec. 6, 2007 (TW) .............. 96146488 A (51) Int. Cl.
*F21V 9/00* (2006.01)
(52) U.S. Cl. .............. 362/231; 362/234; 362/268; 348/744; 359/638; 359/668
(58) Field of Classification Search .............. 348/744; 359/638, 668; 362/231, 234, 268
See application file for complete search history.

(56) References Cited

U.S. PATENT DOCUMENTS

| 4,826,290 A | 5/1989 | Wreede et al. |
| 5,548,347 A * | 8/1996 | Melnik et al. ............... 348/761 |
| 6,282,031 B1 | 8/2001 | Maruyama et al. |
| 6,493,149 B2 | 12/2002 | Ouchi |
| 6,967,777 B2 | 11/2005 | Hirai |
| 7,390,093 B2 * | 6/2008 | Bell et al. .................... 353/31 |
| 2006/0209310 A1 | 9/2006 | Muenz et al. |

FOREIGN PATENT DOCUMENTS

TW 541834 7/2003

* cited by examiner

*Primary Examiner*—Stephen F Husar
(74) *Attorney, Agent, or Firm*—Thomas, Kayden, Horstemeyer & Risley (57) ABSTRACT

An illumination system is provided, which provides a plurality of light beams to a light valve. The illumination system includes a plurality of light sources, a polynomial lens and an optical scanning element. The light sources are capable of emitting the light beams. The polynomial lens is disposed on light paths of the light beams and located between the light sources and the light valve. The polynomial lens shapes the light beams into a plurality of rectangular light beams. The optical scanning element is disposed on light paths of the rectangular light beams and located between the polynomial lens and the light valve. The optical scanning element is capable of moving for scanning the rectangular light beams on the light valve unidirectionally or back and forth along a direction, and the rectangular light beams partially overlap with each other on the light valve.

20 Claims, 8 Drawing Sheets

DISPLAY METHOD AND ILLUMINATION SYSTEM THEREOF

BACKGROUND OF THE INVENTION

1. Field of the Invention

The invention relates to a display method and an illumination system thereof, and more particularly to a display method and an illumination system which increases light usage.

2. Description of the Related Art

Figure 1:
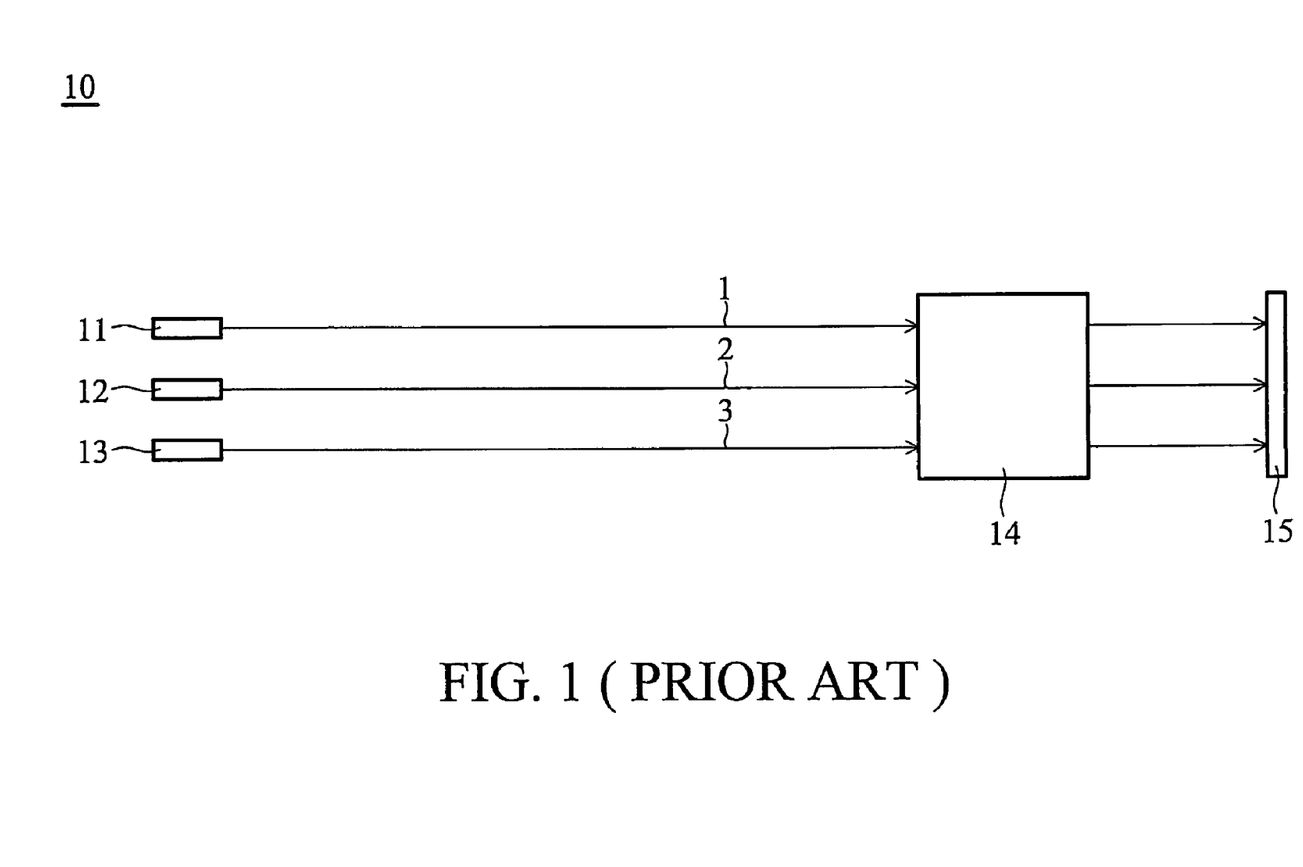
FIG. 1 schematically shows a conventional illumination system
Figure 2A:
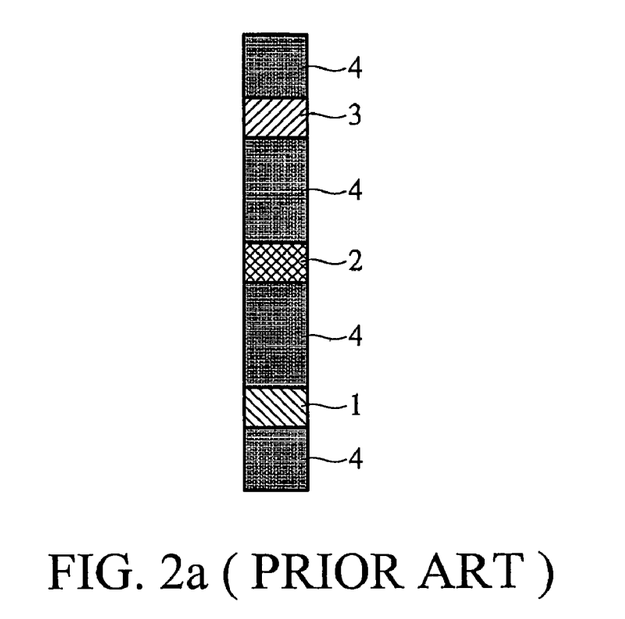
FIG. 2a shows valid illumination areas of the illumination system of FIG. 1.
Figure 2B:
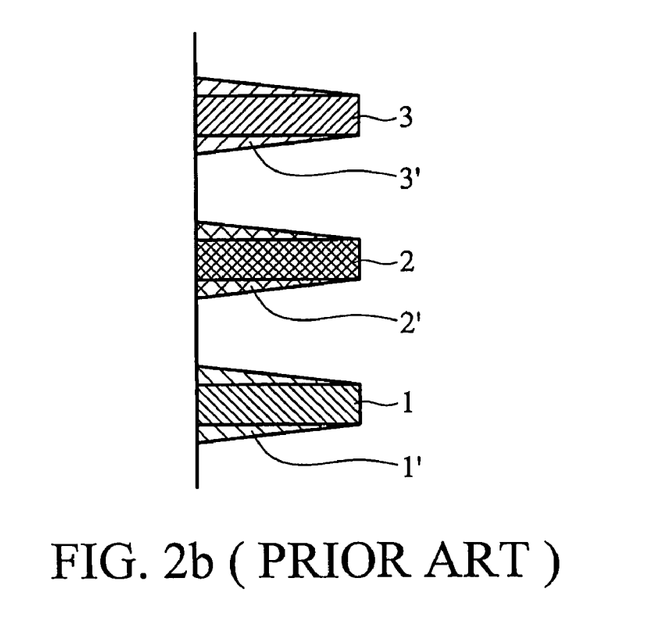
FIG. 2b shows energy distribution of light beams in FIG. 2a along a short axis.
Figure 2C:
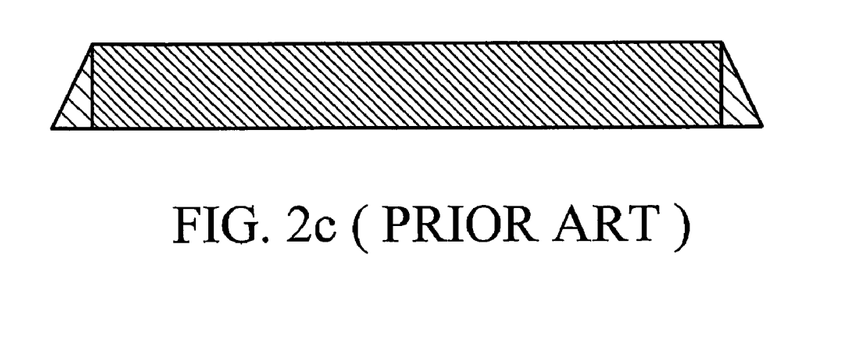
FIG. 2c shows energy distribution of light beams in FIG. 2a along a long axis.
Figure 2D:
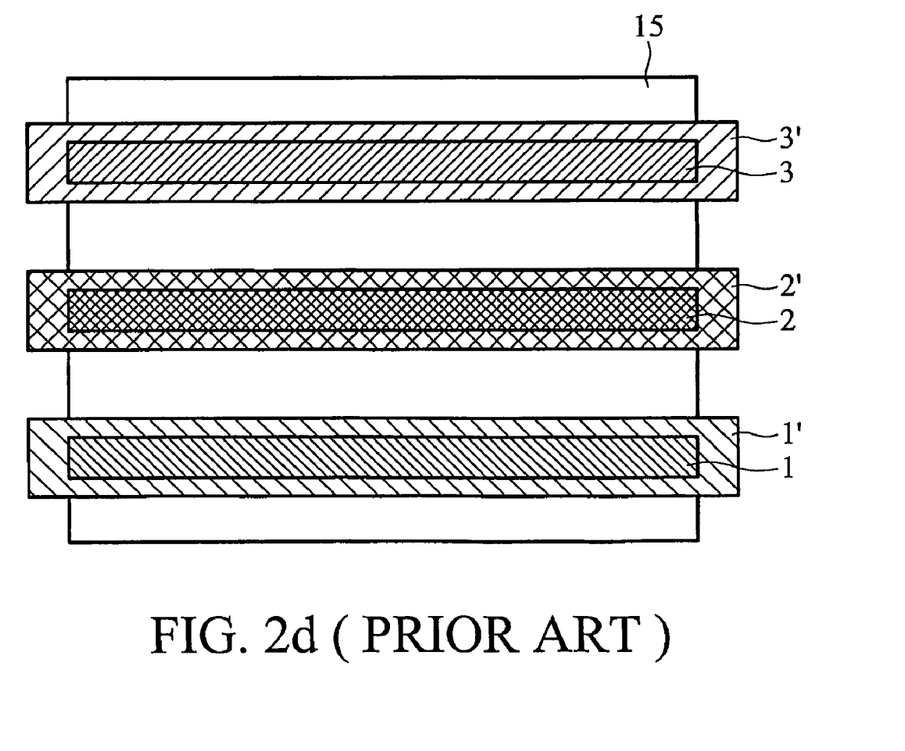
FIG. 2d shows energy distribution of light beams in FIG. 2a on the light valve.

FIG. 1 shows an illumination system of a conventional projection device, wherein a plurality of spot light sources 11, 12 and 13 provide a first light beam (blue) 1, a second light beam (green) 2 and a third light beam (red) 3. The first light beam (blue) 1, the second light beam (green) 2 and the third light beam (red) 3 pass a scrolling element 14 to be scanned on a light valve 15 and mixed into white light beams. With reference to FIGS. 2a, 2b, 2c and 2d, the first light beam (blue) 1, the second light beam (green) 2 and the third light beam (red) 3 are spot light beams, and energy distributions thereof are in Gaussian distribution. Therefore, when the first light beam (blue) 1, the second light beam (green) 2 and the third light beam (red) 3 pass the scrolling element 14 to the light valve 15, decreased area of light spots are utilized, and serious light overfill is generated. As shown in FIG. 2d, a first overfill area 1' surrounds the first light beam 1, a second overfill area 2' surrounds the second light beam 2, and a third overfill area 3' surrounds the third light beam 3. With reference to FIGS. 2a and 2d, only part of the first light beam 1, the second light beam 2 and the third light beam 3 pass the light valve 15 to be used, and areas between the light beams (space areas and overfill areas) are defined as spokes 4 which are stopped by the light valve 15. Conventionally, square measure of spoke 4 is large, and light usage is thus decreased.

BRIEF SUMMARY OF THE INVENTION

The invention provides a display method and an illumination system which increases light usage.

In an embodiment of the invention, an illumination system is provided, which provides a plurality of light beams to a light valve. The illumination system includes a plurality of light sources, a polynomial lens and an optical scanning element. The light sources are capable of emitting the light beams. The polynomial lens is disposed on light paths of the light beams and located between the light sources and the light valve, wherein the polynomial lens shapes the light beams into a plurality of rectangular light beams. The optical scanning element is disposed on light paths of the rectangular light beams and located between the polynomial lens and the light valve, wherein the optical scanning element is capable of moving for scanning the rectangular light beams on the light valve unidirectionally or back and forth along a direction, and the rectangular light beams partially overlap with each other on the light valve.

In an embodiment of the invention, a display method is provided. First, a polynomial lens, an optical scanning and a light valve are provided. Then, a first light source is provided, wherein the first light source provides a first light beam, the first light beam passes the polynomial lens to be shaped into a first rectangular light beam, and the first rectangular light beam passes the optical scanning element to be scanned on the light valve. Next, a second light source is provided, wherein the second light source provides a second light beam, the second light beam passes the polynomial lens to be shaped into a second rectangular light beam, the second rectangular light beam nears the first rectangular light beam, and the second rectangular light beam passes the optical scanning element to be scanned on the light valve. Finally, the polynomial lens is designed to make the first rectangular light beam partially overlap the second rectangular light beam on the light valve, and increase illumination areas of the first and second rectangular light beams. In the embodiment of the invention, there is no space area between the first and second rectangular light beams. Square measure of the spokes (useless area on the light valve) is reduced, and light usage is increased.

Other objectives, features and advantages of the present invention will be further understood from the further technology features disclosed by the embodiments of the present invention wherein they are shown and described as preferred embodiments of this invention, simply by way of illustration of modes best suited to carry out the invention.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In the following detailed descriptions of the embodiments of the present invention, reference is made to the accompanying drawings which form a part hereof, and shows by way of illustration the method in which the present invention may be practiced. In this regard, directional terminology, such as "top," "bottom," "front," "back," etc., is used with reference to the orientation of the Figure(s) being described. Meanwhile, the components of the present invention can be positioned in a number of different orientations. As such, the directional terminology is used for purposes of illustration and is by no means limiting. Additionally, the drawings are only schematic and the sizes of components may be exaggerated for clarity. It is also to be understood that other embodiments may be utilized and structural changes may be made without departing from the general scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless otherwise limited, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect surface-to-surface/directional orientations, and "adjacent to" and variations thereof herein are used broadly and encompass directly and indirectly "adjacent to" orientations. Therefore, the description of "A" component is facing "B" component herein may encompass situations where "A" component faces "B" component directly or one or more additional components are between "A" component and "B" component. Also, the description of "A" component is adjacent to "B" component herein may encompass situations where "A" component is directly adjacent to "B" component or one or more additional components are between "A" component and "B" component. Accordingly, the drawings and descriptions will be regarded as illustrative in nature and not as restrictive.

Figure 3:
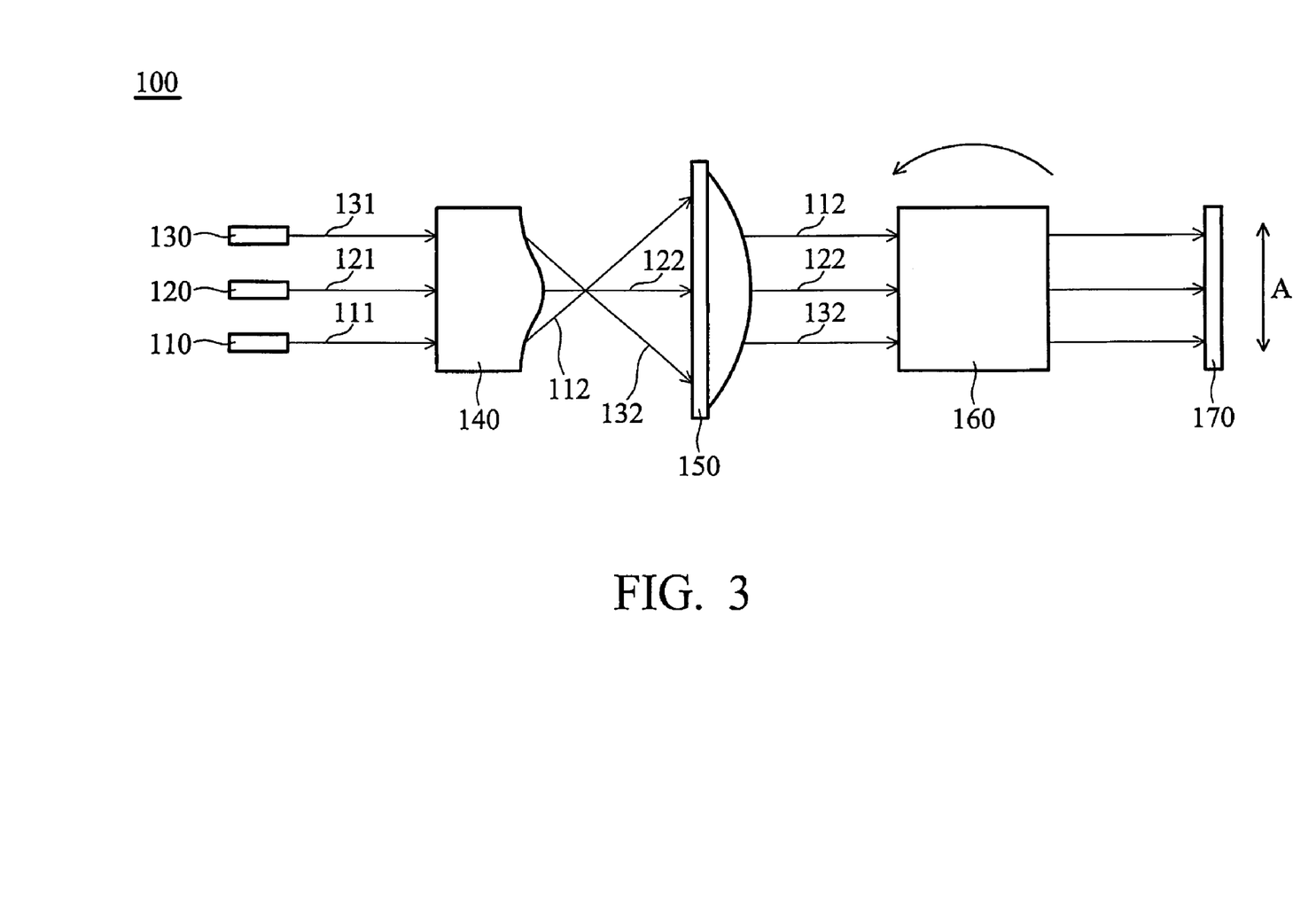
FIG. 3 shows an illumination system of a first embodiment of the invention.

FIG. 3 shows an illumination system 100 of a first embodiment of the invention, which provides light beams 111, 121 and 131 to a light valve 170. The illumination system 100 includes a first light source (for example, blue light source) 110, a second light source (for example, green light source) 120, a third light source (for example, red light source) 130, a polynomial lens 140, a field lens 150 and an optical scanning element 160. The first light source 110 is capable of emitting the first light beam 111. The second light source 120 is capable of emitting the second light beam 121. The third light source 130 is capable of emitting the third light beam 131. The polynomial lens 140 is disposed on light paths of the light beams 111, 121 and 131 and located between the light sources 110, 120 and 130 and the light valve 170 to shape the light beams 111, 121, and 131 into rectangular light beams 112, 122 and 132. The field lens 150 and the optical scanning element 160 are disposed on light paths of the rectangular light beams 112, 122 and 132. The field lens 150 is located between the polynomial lens 140 and the optical scanning element 160, and the optical scanning element 160 is located between the polynomial lens 140 and the light valve 170. The field lens 150 guides the rectangular light beams 112, 122 and 132 into parallel light beams, and the rectangular light beams 112, 122 and 132 travel from the field lens 150 to the optical scanning element 160. The optical scanning element 160 is movable (rotatable), and scans the rectangular light beams 112, 122 and 132 on the light valve 170 unidirectionally or back and forth along a direction A. The rectangular light beams 112, 122 and 132 partially overlap with each other on the light valve 170 (with reference to FIG. 5d). Specifically, The first light source 110 provides the first light beam 111, the second light source 120 provides the second light beam 121 and the third light source 130 provides the third light beam 131. The first light beam 111 passes the polynomial lens 140 to be shaped into the first rectangular light beam 112, the second light beam 121 passes the polynomial lens 140 to be shaped into the second rectangular light beam 122, and the third light beam 131 passes the polynomial lens 140 to be shaped into the third rectangular light beam 132. The first rectangular light beam 112, the second rectangular light beam 122 and the third rectangular light beam 132 traveled from the polynomial lens 140 pass the field lens 150, and are guided into parallel light beams by the field lens 150, and are incident on the optical scanning element 160 to be scanned on the light valve 170. The optical scanning element 160 reduces coherence of the first rectangular light beam 112, the second rectangular light beam 122 and the third rectangular light beam 132.

The optical scanning element 160 may be a scrolling prism. The polynomial lens 140 may be a diffraction optical element or a free form surface lens. When the polynomial lens 140 is a free form surface lens, surface formula thereof at least is an eight order formula satisfying the following equation:

$$\text{sag}: z = a^2*x^2 + a^4*x^4 + a^6*x^6 + a^8*x^8 + x^8*b^2*y^2 + b^4*y^4 + b^6*y^6 + b^8*y^8$$

In the equation above, a and b are parameters. x, y and z are coordinates in an x-y-z coordinate system. Through the polynomial lens 140, the energy distributions of the first rectangular light beam 112, the second rectangular light beam 122 and the third rectangular light beam 132 are approximately shaped into square waves.

A diffuser may be disposed on a surface of the optical scanning element 160 to reduce coherence.

Figure 4:
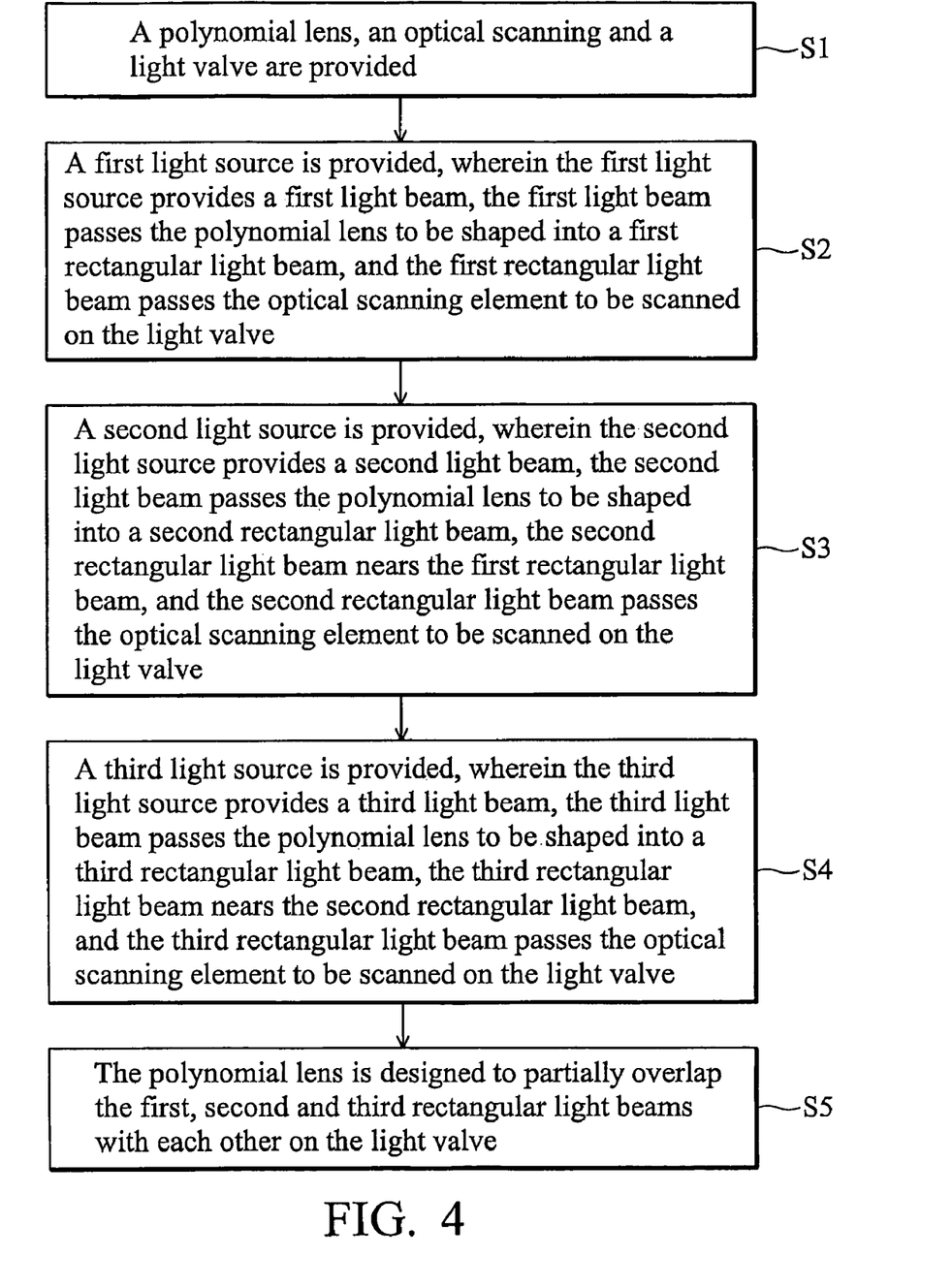
FIG. 4 shows a display method of an embodiment of the invention.

FIG. 4 shows a display method of an embodiment of the invention. First, a polynomial lens, an optical scanning element and a light valve are provided (S1). Then, a first light source is provided, wherein the first light source provides a first light beam, the first light beam passes the polynomial lens to be shaped into a first rectangular light beam, and the first rectangular light beam passes the optical scanning element to be scanned on the light valve (S2). Next, a second light source is provided, wherein the second light source provides a second light beam, the second light beam passes the polynomial lens to be shaped into a second rectangular light beam, the second rectangular light beam nears the first rectangular light beam, and the second rectangular light beam passes the optical scanning element to be scanned on the light valve (S3). Then, a third light source is provided, wherein the third light source provides a third light beam, the third light beam passes the polynomial lens to be shaped into a third rectangular light beam, the third rectangular light beam nears the second rectangular light beam, and the third rectangular light beam passes the optical scanning element to be scanned on the light valve (S4). Finally, the polynomial lens is designed to make the first, second and third rectangular light beams partially overlap with each other on the light valve (S5).

Figure 5A:
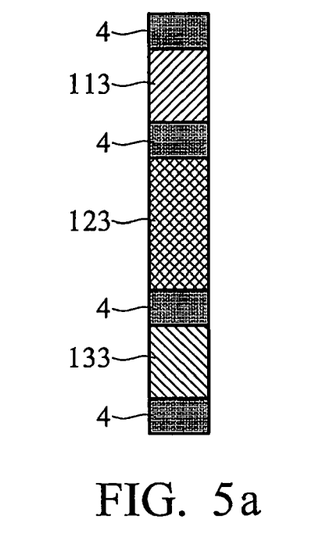
FIG. 5a shows valid illumination areas of the illumination system of the first embodiment of the invention.
Figure 5B:
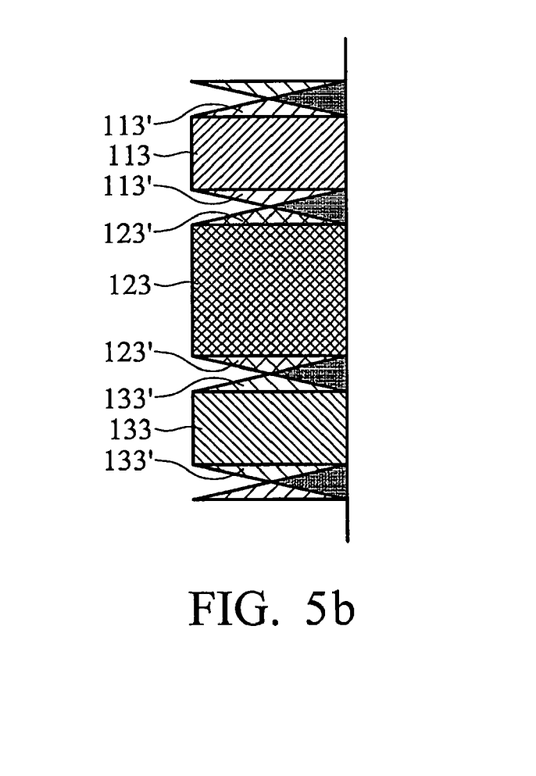
FIG. 5b shows energy distribution of light beams of the first embodiment of the invention along a short axis.
Figure 5C:
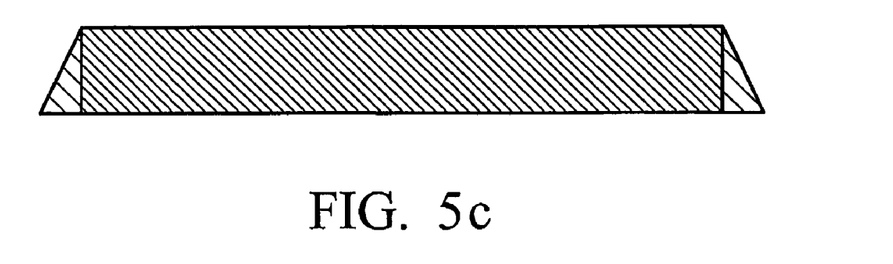
FIG. 5c shows energy distribution of light beams of the first embodiment of the invention along a long axis.
Figure 5D:
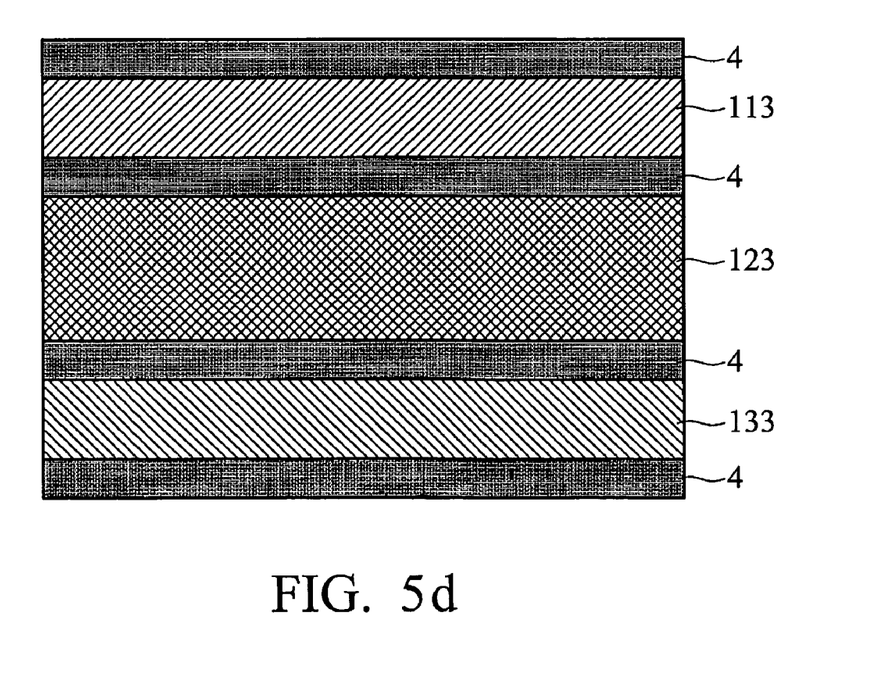
FIG. 5d shows energy distribution of light beams of the first embodiment of the invention on the light valve.

With reference to FIGS. 5a, 5b, 5c and 5d. FIG. 5a shows valid illumination areas of the illumination system of the first embodiment of the invention. FIG. 5b shows energy distribution of light beams of the first embodiment of the invention along a short axis. FIG. 5c shows energy distribution of light beams of the first embodiment of the invention along a long axis. FIG. 5d shows energy distribution of light beams of the first embodiment of the invention on the light valve. With reference to FIG. 5b, adjusting the design of the polynomial lens, the first rectangular light beam 112 forms a first main-band 113 and two first sub-bands 113' on the light valve. The first sub-bands 113' are located on two sides on the first main-band 113 respectively. The second rectangular light beam 122 forms a second main-band 123 and two second sub-bands 123' on the light valve. The second sub-bands 123' are located on two sides on the second main-band 123 respectively. The third rectangular light beam 132 forms a third main-band 133 and two third sub-bands 133' on the light valve. The third sub-bands 133' are located on two sides on the third main-band 133 respectively. The first sub-band 113' partially overlaps the second sub-band 123' next thereto. The second sub-band 123' overlaps the third sub-band 133' next thereto. In the first embodiment of the invention, the first sub-band 113' totally overlaps the second sub-band 123' next thereto. The second sub-band 123' totally overlaps the third sub-band 133' next thereto. The first sub-bands 113', the second sub-bands 123' and the third sub-bands 133' are overfill areas. With reference to FIGS. 5b and 5c, energy distributions of the first rectangular light beam 112, the second rectangular light beam 122 and the third rectangular light beam 132 approximate to square waves. Therefore, with reference to FIGS. 5a and 5d, the first main-band 113, the second main-band 123 and the third main-band 133 provide uniformed illumination with increased valid illumination areas. There is no space area between the main-band and the sub-band next thereto. Areas where the sub-bands overlap with each other are defined as spokes 4. The spokes 4 are stopped by the light valve. In the embodiment of the invention, square measure of the spokes 4 is reduced, useless area on the light valve is reduced, and light usage is increased.

Figure 6A:
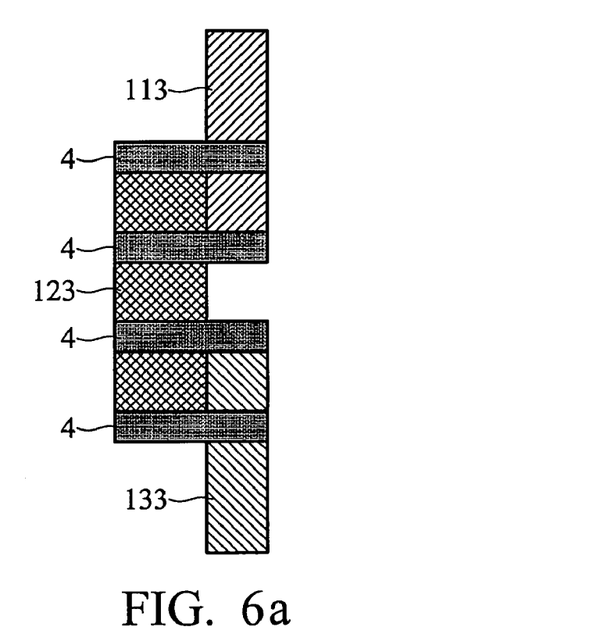
FIG. 6a shows valid illumination areas of the illumination system of a second embodiment of the invention.
Figure 6B:
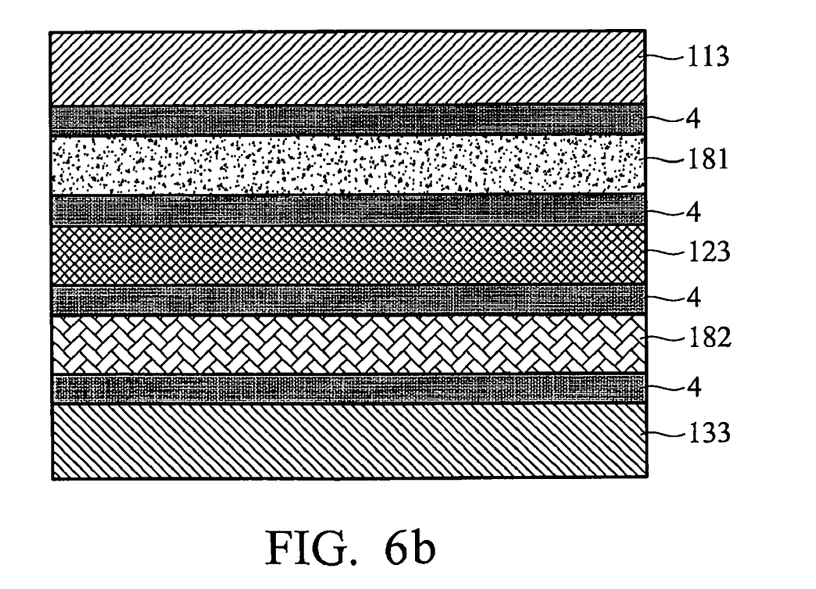
FIG. 6b shows energy distribution of light beams of the second embodiment of the invention on the light valve.

With reference to FIGS. 6a and 6b, FIG. 6a shows valid illumination areas of the illumination system of a second embodiment of the invention, and FIG. 6b shows energy distribution of light beams of the second embodiment of the invention on the light valve.

In the second embodiment, the design of polynomial lens is designed to further increase square measure of the main-bands and overlap other main-bands next thereto. With reference to FIGS. 6a and 6b, the first main-band 113 partially overlaps the second main-band 123 to form a mixed main-band 181. The first main-band 113 is a blue light strap, the second main-band 123 is a green light strap, and the mixed main-band 181 is a cyan light strap. The second main-band 123 partially overlaps the third main-band 133 to form a mixed main-band 182. The third main-band 133 is a red light strap, and the mixed main-band 182 is a yellow light strap. Areas where the sub-bands overlap the main-bands are defined as spokes 4. In the second embodiments, image process technology (for example, Brilliantcolor) may be utilized to improve color quality.

The light beams passing the polynomial lens are shaped into rectangular light beams with increased valid illumination square measure. The rectangular light beams are scanned to the light valve by the optical scanning element, wherein the rectangular light beams overlap with each other. Thus, there is no space area between the rectangular light beam and other rectangular light beams next thereto. Square measure of the spokes 4 is reduced, useless area on the light valve is reduced, and light usage is increased. Additionally, color harmony is also improved.

The foregoing descriptions of the preferred embodiments of the present invention have been presented for purposes of illustration and description. It is not intended to be exhaustive or to limit the present invention to a precise form or to the exemplary embodiments disclosed. Accordingly, the foregoing description should be regarded as illustrative rather than restrictive. Obviously, a variety of modifications and variations will be apparent to those with ordinary skill in the art. Moreover, the embodiments are chosen and described in order to best explain the principles of the present invention and its best mode practical applications, to enable those with ordinary skill in the art to understand the present invention for implementation of various embodiments and modifications of the present invention, which conform to particular usages or contemplated implementations. It is intended that the scope of the present invention be defined by the claims appended hereto and their equivalents, whereby all terms are meant in their broadest reasonable sense unless otherwise indicated. Therefore, the term "the invention", "the present invention" or the like does not necessarily limit the claim scope to a specific embodiment, and references to "preferred exemplary embodiments of the present invention", do not imply a limitation on the present invention and no such limitation is to be inferred. The present invention is limited only by the general spirit and scope of the appended claims. The abstract of the present disclosure is provided to comply with the rules required for an abstract, which will allow a searcher to quickly ascertain the subject matter of the technical disclosure of any patent issued related to the present disclosure. It is submitted with the understanding that it will not be used to interpret or limit the scope or meaning of the claims. Meanwhile, any advantages and benefits described in the present disclosure for the present invention may not apply to all embodiments of the present invention. It should be appreciated that variations may be made to the embodiments described herein by those skilled in the art, without departing from the general scope of the present invention as defined by the following claims. Moreover, no element and component in the present disclosure is intended to be dedicated to the public, regardless of whether the element or component is explicitly recited in the following claim.

What is claimed is:

1. An illumination system, comprising:
   a plurality of light sources, capable of emitting a plurality of light beams;
   a polynomial lens, disposed on light paths of the light beams and located between the light sources and a light valve, wherein the polynomial lens shapes the light beams into a plurality of rectangular light beams; and
   an optical scanning element, disposed on light paths of the rectangular light beams and located between the polynomial lens and the light valve, wherein the optical scanning element is capable of moving for scanning the rectangular light beams on the light valve unidirectionally or back and forth along a direction, and the rectangular light beams partially overlap with each other on the light valve.

2. The illumination system as claimed in claim 1, wherein the optical scanning element comprises a scrolling prism.

3. The illumination system as claimed in claim 1, wherein the polynomial lens comprises a free form surface lens.

4. The illumination system as claimed in claim 1, wherein the polynomial lens comprises a diffraction optical element.

5. The illumination system as claimed in claim 1, further comprising a field lens disposed on the light paths of the rectangular light beams and located between the polynomial lens and the optical scanning element to guide the rectangular light beams into a plurality of parallel light beams, wherein the parallel light beams are incident on the optical scanning element.

6. The illumination system as claimed in claim 1, wherein an energy distribution of the rectangular light beams comprises a square wave.

7. The illumination system as claimed in claim 1, further comprising a diffuser, disposed on a surface of the optical scanning element.

8. The illumination system as claimed in claim 1, wherein the light sources comprise a red light source, a blue light source and a green light source.

9. A display method, comprising:
   providing a polynomial lens, an optical scanning element and a light valve;
   providing a first light source, wherein the first light source provides a first light beam, the first light beam passes the polynomial lens to be shaped into a first rectangular light beam, and the first rectangular light beam passes the optical scanning element to be scanned on the light valve;

providing a second light source, wherein the second light source provides a second light beam, the second light beam passes the polynomial lens to be shaped into a second rectangular light beam, the second rectangular light beam nears the first rectangular light beam, and the second rectangular light beam passes the optical scanning element to be scanned on the light valve; and designing the polynomial lens to make the first rectangular light beam partially overlap the second rectangular light beam on the light valve.

10. The display method as claimed in claim 9, wherein the first rectangular light beam forms a first main-band and two first sub-bands on the light valve, the first sub-bands are located on two sides of the first main-band respectively, the second rectangular light beam forms a second main-band and two second sub-bands on the light valve, and the second sub-bands are located on two sides of the second main-band respectively.

11. The display method as claimed in claim 10, wherein the first sub-band partially overlaps the second sub-band next thereto.

12. The display method as claimed in claim 11, wherein an area where the first sub-band partially overlaps the second sub-band is defined as a spoke.

13. The display method as claimed in claim 10, wherein the first sub-band totally overlaps the second sub-band next thereto.

14. The display method as claimed in claim 13, wherein an area where the first sub-band totally overlaps the second sub-band is defined as a spoke.

15. The display method as claimed in claim 10, wherein the first main-band partially overlaps the second main-band.

16. The display method as claimed in claim 15, wherein an area where the first main-band partially overlaps the second main-band is defined as a mixed main-band.

17. The display method as claimed in claim 15, wherein an area where the first sub-band overlaps the second main-band is defined as a spoke, and an area where the second sub-band overlaps the first main-band is also defined as a spoke.

18. The display method as claimed in claim 9, wherein a color of the first light beam differs from a color of the second light beam.

19. The display method as claimed in claim 9, wherein the polynomial lens comprises a free form surface lens.

20. The display method as claimed in claim 9, wherein the optical scanning element comprises a scrolling prism.

* * * * *